United States Patent
Ittogi et al.

(10) Patent No.: US 11,507,159 B2
(45) Date of Patent: Nov. 22, 2022

(54) VERIFICATION DEVICE AND VERIFICATION TARGET DEVICE THAT OPERATES USING OPERATION POWER SUPPLIED FROM THE VERIFICATION DEVICE

(71) Applicant: CANON KABUSHIKI KAISHA, Tokyo (JP)

(72) Inventors: Hirotaka Ittogi, Yokohama (JP); Kenjiro Hori, Tokorozawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/682,660

(22) Filed: Nov. 13, 2019

(65) Prior Publication Data

US 2020/0081509 A1     Mar. 12, 2020

Related U.S. Application Data

(63) Continuation of application No. 15/475,640, filed on Mar. 31, 2017, now Pat. No. 10,528,107.

(30) Foreign Application Priority Data

Apr. 8, 2016   (JP) ................................. 2016-078428

(51) Int. Cl.
    *G06F 1/00*          (2006.01)
    *G06F 1/26*          (2006.01)

(52) U.S. Cl.
    CPC .................................... *G06F 1/266* (2013.01)

(58) Field of Classification Search
    CPC ........................................................ G06F 1/266
    See application file for complete search history.

(56) References Cited

U.S. PATENT DOCUMENTS

2008/0197802 A1*   8/2008   Onishi .................... H02J 50/12
                                                             320/106
2009/0271606 A1    10/2009   Sugano
(Continued)

FOREIGN PATENT DOCUMENTS

| | | |
|---|---|---|
| JP | H8-287202 | 11/1996 |
| JP | 2015-39248 | 2/2015 |

OTHER PUBLICATIONS

Japanese Office Action dated Mar. 13, 2020 issued in corresponding Japanese application No. 2016-078428. (English language translation included).

*Primary Examiner* — Mohammed H Rehman
(74) *Attorney, Agent, or Firm* — Venable LLP

(57) ABSTRACT

A verification device is configured to supply operation power to a verification target device in order to communicate with the verification target device, and perform verification of the verification target device. The verification device includes: a detection unit configured to detect a value of a current that flows in the verification device due to the operation power being supplied to the verification target device; a determination unit configured to determine whether or not the value of the current is greater than a threshold value; and a verification unit configured to verify authenticity of the verification target device according to whether or not the value of the current is greater than the threshold value.

11 Claims, 12 Drawing Sheets

(56) References Cited

U.S. PATENT DOCUMENTS

| | | | |
|---|---|---|---|
| 2014/0375341 A1* | 12/2014 | Fender | H01L 23/585 |
| | | | 324/693 |
| 2016/0087983 A1 | 3/2016 | Mansour | |
| 2016/0283714 A1 | 9/2016 | Lemay | |
| 2017/0109509 A1 | 4/2017 | Baghdasaryan | |
| 2017/0235939 A1 | 8/2017 | Caporale | |
| 2020/0026342 A1* | 1/2020 | Sengupta | G06F 1/3231 |
| 2022/0114264 A1* | 4/2022 | Ellis, Jr. | G06F 21/73 |

* cited by examiner

VERIFICATION DEVICE AND VERIFICATION TARGET DEVICE THAT OPERATES USING OPERATION POWER SUPPLIED FROM THE VERIFICATION DEVICE

This application is a continuation of U.S. application Ser. No. 15/475,640, filed Mar. 31, 2017, the contents of which are incorporated herein.

BACKGROUND OF THE INVENTION

Field of the Invention

The present invention relates to a verification technique for verifying the authenticity of a verification target device.

Description of the Related Art

Japanese Patent Laid-Open No. 8-287202 discloses an authentication method based on a cryptographic technique. Specifically, Japanese Patent Laid-Open No. 8-287202 discloses that a verification target device is subjected to authentication due to a verification device and the verification target device sharing confidential information, and the verification device checking that the verification target device has the confidential information. Normally, the verification target device is constituted by an IC chip or an IC tag. The IC chip or the IC tag operates by receiving an electrical power from an external device. The calculation amount for cryptographic processing that is performed by the IC tag or IC chip in order to perform authentication is large. Here, the operation power at the time of performing cryptographic processing is larger when a processor or the like is used to perform cryptographic processing using software than when the cryptographic processing is realized using hardware.

Note that it is envisioned that the confidential information possessed by the verification target device is leaked. Accordingly, it is required that the authenticity of the verification target device is verified also in the case where the confidential information is leaked.

SUMMARY OF THE INVENTION

According to an aspect of the present invention, a verification device is configured to supply operation power to a verification target device in order to communicate with the verification target device, and perform verification of the verification target device. The verification device includes: a detection unit configured to detect a value of a current that flows in the verification device due to the operation power being supplied to the verification target device; a determination unit configured to determine whether or not the value of the current is greater than a threshold value; and a verification unit configured to verify authenticity of the verification target device according to whether or not the value of the current is greater than the threshold value.

Further features of the present invention will become apparent from the following description of exemplary embodiments with reference to the attached drawings.

DESCRIPTION OF THE EMBODIMENTS

Figure 1:
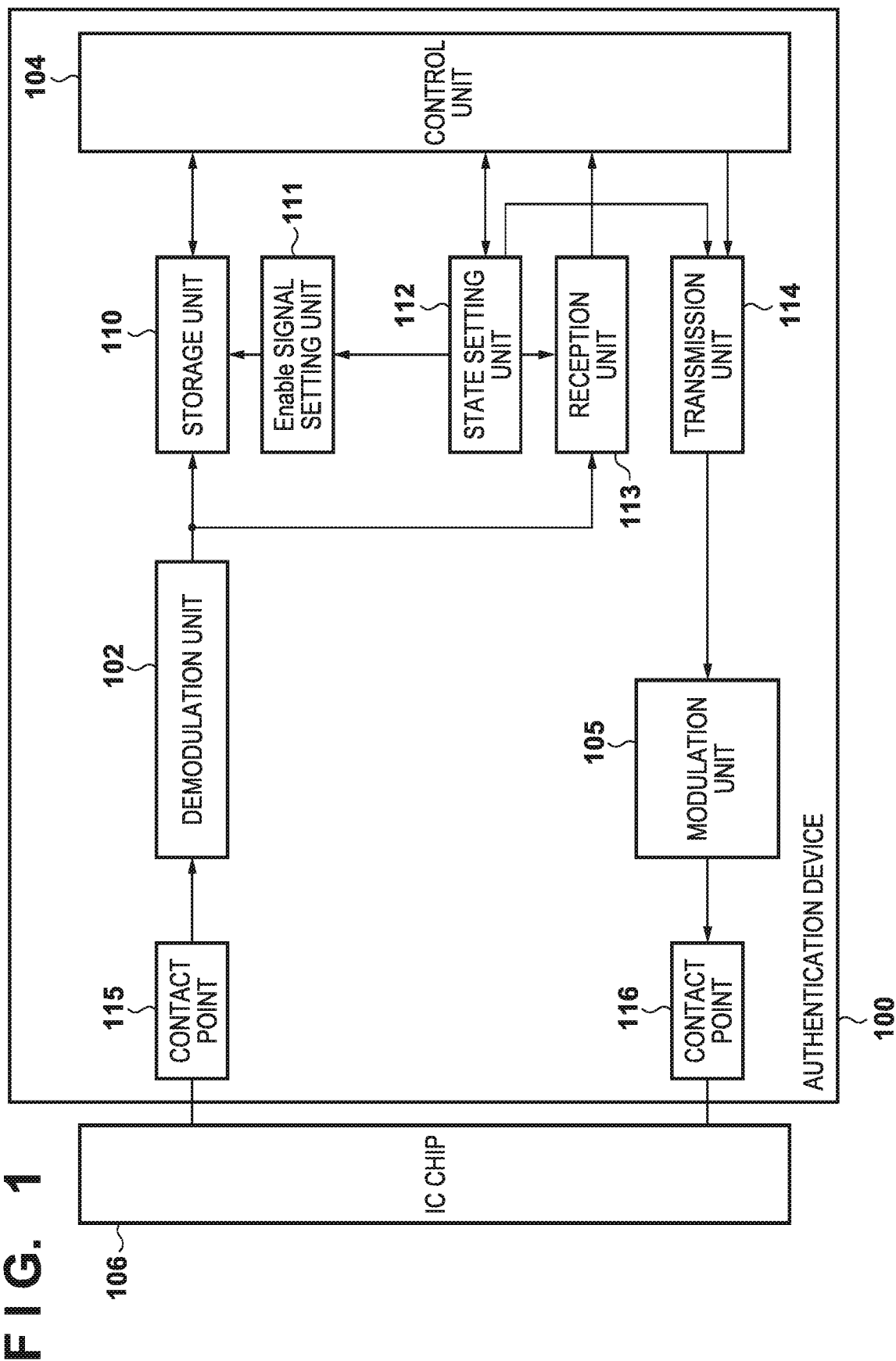
FIG. 1 is a diagram of a configuration of a verification device according to an embodiment.

Hereinafter, exemplary embodiments of the present invention will be described with reference to the drawings. Note that the following embodiments are exemplary, and the present invention is not limited to the content of the embodiments. Also, in the drawings described below, constituent elements that are not needed in the description of the embodiments are not included in the drawings.

First Embodiment

FIG. 1 is a diagram of a schematic configuration of a verification device 100 according to an embodiment. Note that in FIG. 1, an IC chip 106 is a verification target device and performs communication for authentication processing with the verification device 100. For example, the verification device 100 is provided in the body of an image forming apparatus, and the IC chip 106, which is the verification target device, is attached to a replacement part or the like that can be attached to and detached from the image forming apparatus. Also, the image forming apparatus verifies the authenticity of the attached replacement part by verifying the authenticity of the IC chip 106. The IC chip 106 is connected to contact points 115 and 116 of the verification device 100. The verification device 100 supplies operation power to the IC chip 106 via the contact points 115 and 116 and transmits and receives various types of information to and from the IC chip 106 via the contact points 115 and 116. The IC chip 106 holds authentication information, which is confidential information, and the verification device 100 performs authentication processing on the IC chip 106 based on the authentication information held by the IC chip 106. Note that any known method can be used in the authentication processing. Based on the voltage at the contact point 115, the demodulation unit 102 determines whether the data value received from the IC chip 106 is 0 or 1. In the present embodiment, if the received data value is 0, the demodulation unit 102 outputs a low-level signal, and if the received data value is 1, the demodulation unit 102 outputs a high-level signal.

Figure 2:
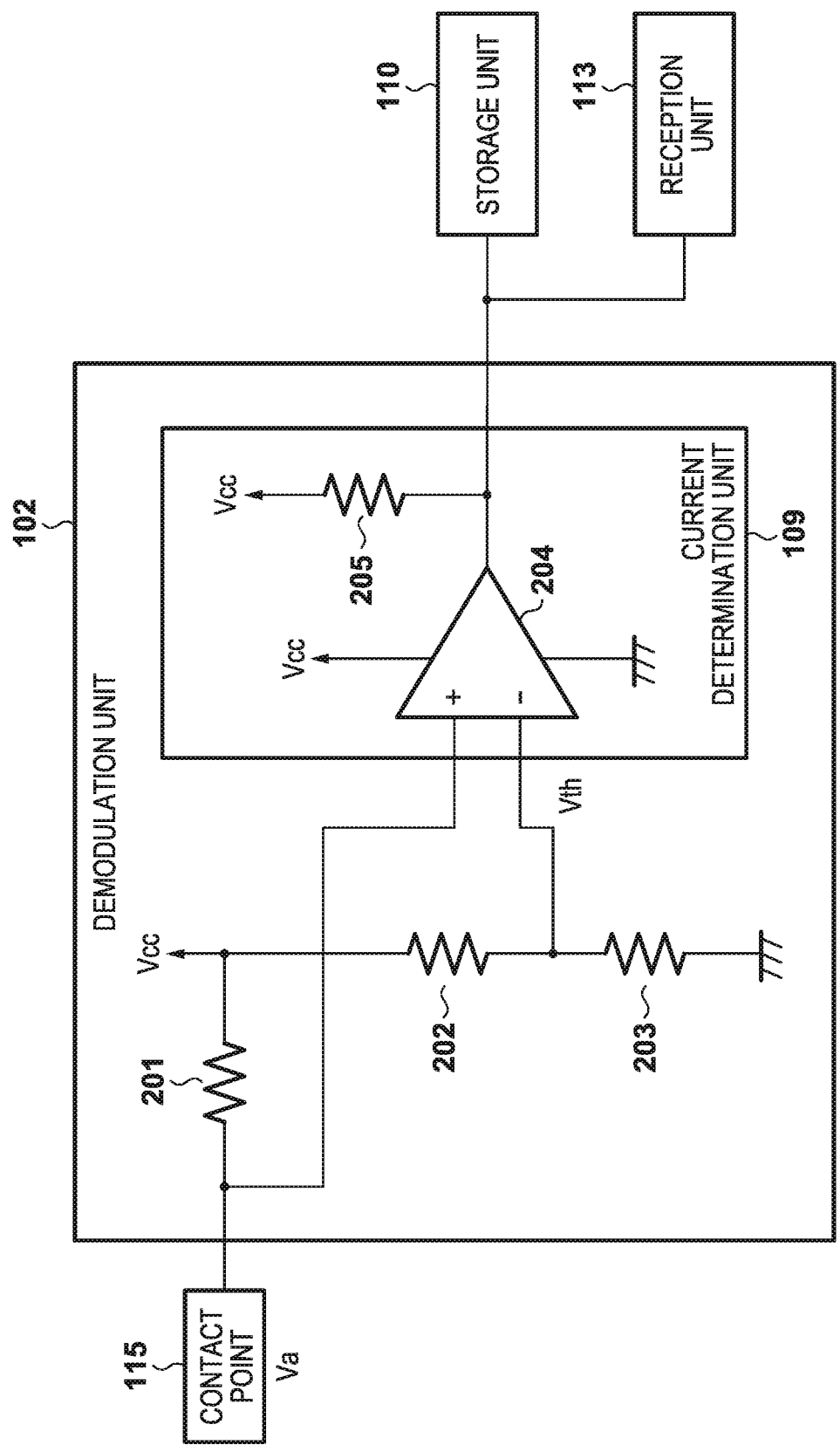
FIG. 2 is a diagram of a configuration of a demodulation unit according to an embodiment.

FIG. 2 is a diagram showing a configuration of the demodulation unit 102. Although the details will be described later, in the present embodiment, the IC chip 106 transmits 0 or 1 as the data value by increasing and reducing the operation power (consumed power). In the description below, if the IC chip 106 transmits 0 as the data value, the operation power is increased to be greater than in the case of transmitting 1 as the data value. A comparator 204 compares a voltage Va of the contact point 115 and a threshold voltage Vth obtained by dividing a power source voltage Vcc using resistors 202 and 203. Then, if the voltage Va is higher than the threshold voltage Vth, the comparator 204 outputs a high-level signal, and otherwise, the comparator 204 outputs a low-level signal. The voltage Va is lowered from the power source voltage Vcc by the voltage step-down amount of the resistor 201, and the voltage step-down amount of the resistor 201 changes according to the value of the current that flows in the IC chip 106.

As described above, the operation power of the IC chip 106 is greater in the case where the data value 0 is transmitted than in the case where the data value 1 is transmitted. Accordingly, the current that flows to the IC chip 106 when the IC chip 106 transmits the data value 0 is greater than the current that flows to the IC chip 106 when the data value 1 is transmitted. In other words, if VH is the voltage Va in the case where the IC chip 106 transmits the data value 1 and VL is the voltage Va in the case where the IC chip 106 transmits the data value 0, VH>VL is satisfied. Thus, the resistor 201 functions as a current detection unit that detects the value of the current flowing to the IC chip 106.

In the present embodiment, the threshold voltage Vth is set between VH and VL. In this case, if the IC chip 106 transmits the data value 1, the comparator 204 outputs a high-level signal, and if the IC chip 106 transmits the data value 0, the comparator 204 outputs a low-level signal. Note that in FIG. 2, the resistor 205 is a pull-up resistor. In the present embodiment, the comparator 204 and the resistor 205 constitute a current determination unit 109 that determines whether or not the current that flows to the IC chip 106 is larger than a threshold value.

Figure 13:
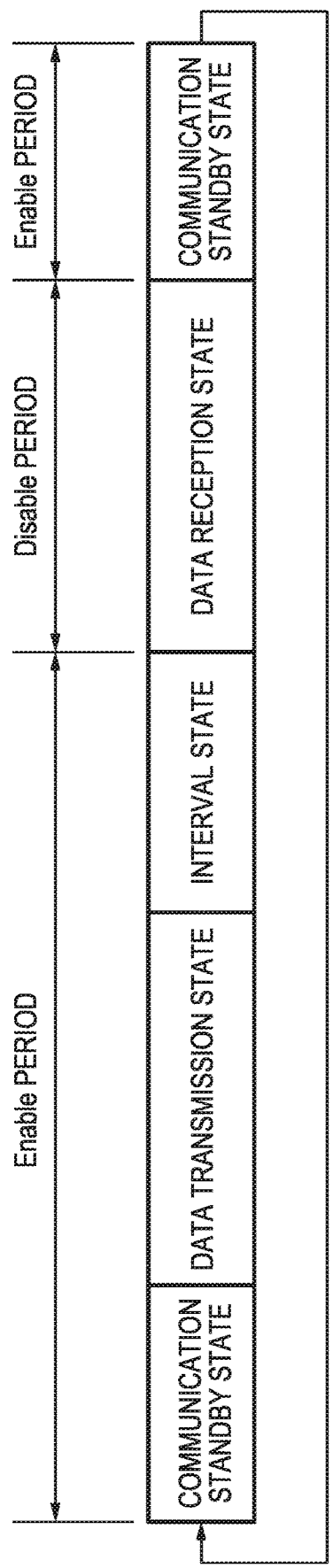
FIG. 13 is a diagram showing state transitions according to an embodiment.

Returning to FIG. 1, a state setting unit 112 manages the state of processing for communicating with the IC chip 106. FIG. 13 is a diagram of transitions in the communication state according to the present embodiment. In the data transmission state, the verification device 100 transmits data to the IC chip 106. In the data reception state, the IC chip 106 transmits data to the verification device 100. The interval state is a standby period between the data transmission state and the data reception state. For example, during the interval state, the IC chip 106 executes cryptographic processing or the like for authentication based on information indicated by the data received from the verification device 100. Also, in the data reception state, the IC chip 106 transmits to the verification device 100 the data in response to the information received from the verification device 100. The communication standby state is the period from when data transmission and reception between the verification device 100 and the IC chip 106 ends to when the next transmission and reception is started. For example, in the communication standby state, the verification device 100 processes the data received from the IC chip 106 and then obtains the information to be transmitted to the IC chip 106. The state setting unit 112 manages the states shown in FIG. 13 based on instructions from a control unit 104 and notifies the units of the current state. Note that as shown in FIG. 13, the period of the data reception state is referred to as a Disable period, and the period of a state other than the data reception state is referred to as an Enable period.

Returning to FIG. 1, during the data reception state, the reception unit 113 takes in the output signal of the demodulation unit 102 in accordance with a synchronization clock and outputs the signal to the control unit 104. During the communication standby state, the control unit 104 performs processing on the data received from the IC chip 106. Also, the control unit 104 generates data to be transmitted to the IC chip 106 and outputs it to the transmission unit 114. During the data transmission state, the transmission unit 114 outputs a signal corresponding to the data to be transmitted to the modulation unit 105 in accordance with a synchronization clock.

Figure 3:
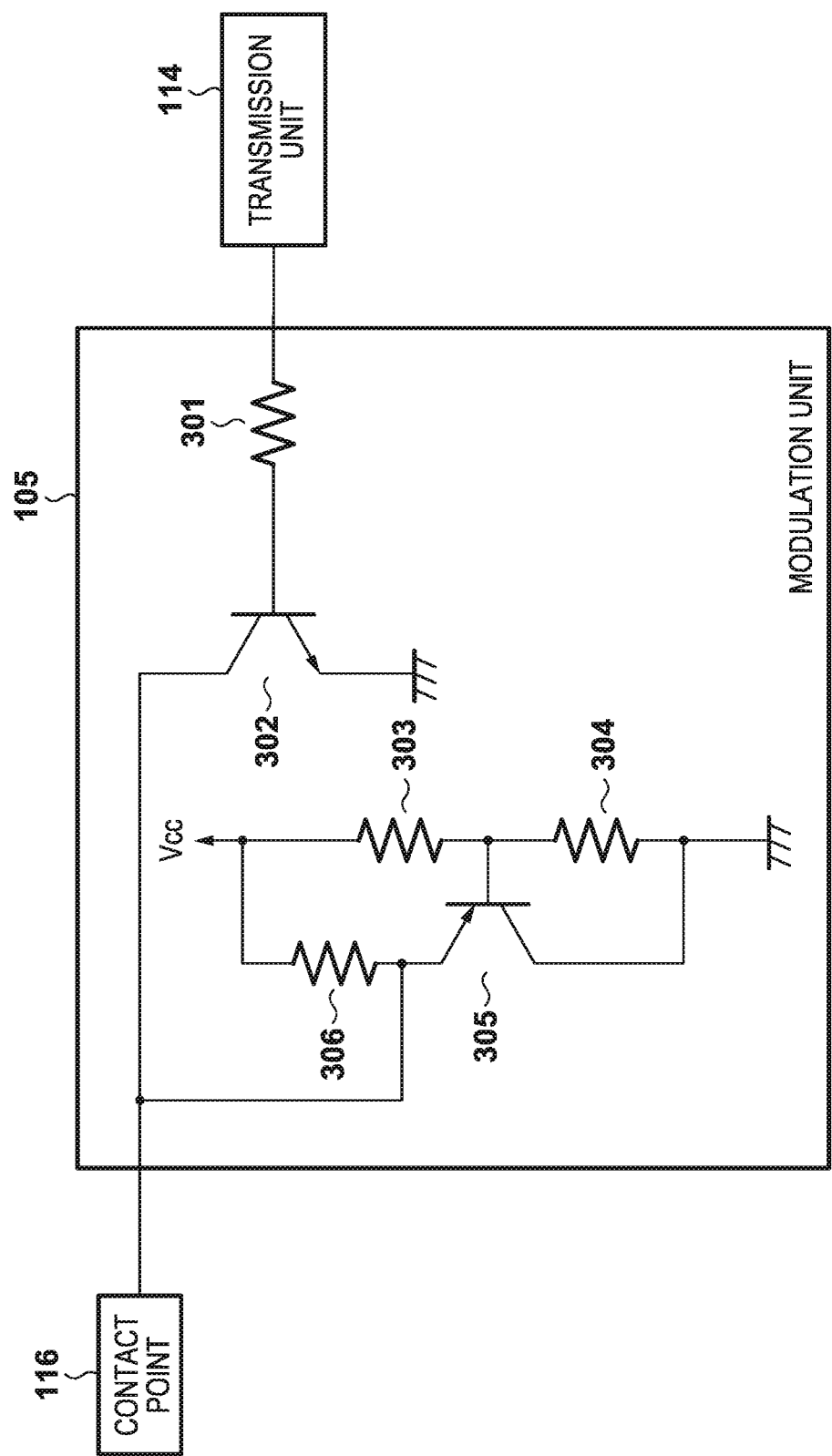
FIG. 3 is a diagram of a configuration of a modulation unit according to an embodiment.

FIG. 3 is a diagram of a configuration of the modulation unit 105. The signal from the transmission unit 114 switches on and off a transistor 302 via a resistor 301 for restricting the current. Resistors 303 and 304 divide the power source voltage Vcc and input the divided voltage into the base terminal of a transistor 305. A resistor 306 is a pull-up resistor for providing a voltage to the emitter terminal of the transistor 305. For example, if the signal from the transmission unit 114 is at a high level, the current from the contact point 116 flows to the ground via the transistor 302. Accordingly, the voltage of the contact point 116 is approximately 0 V. On the other hand, if the signal from the transmission unit 114 is at a low level, the voltage of the contact point 116 is a voltage obtained by adding the voltage between the base and the emitter of the transistor 305 to the voltage of the base terminal of the transistor 305. Hereinafter, this voltage is referred to as VM.

Figure 11:
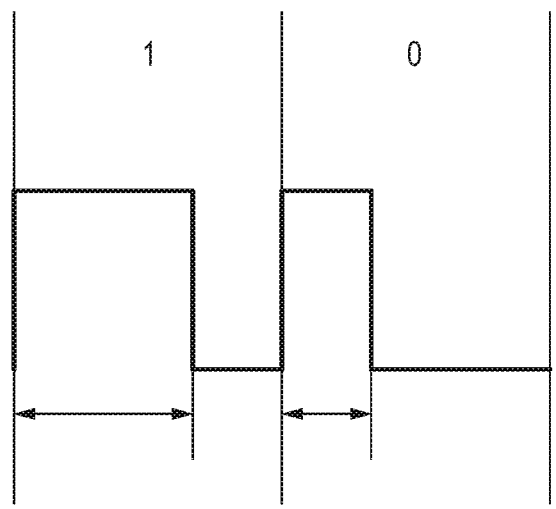
FIG. 11 is a diagram showing a relationship between a data value and a signal waveform according to an embodiment.

In the present embodiment, in the case of transmitting one bit, first the transmission unit 114 outputs a high-level signal and thereafter outputs a low-level signal. Here, if the data value to be transmitted is 1, the high-level period will be longer than the low-level period. On the other hand, if the data value to be transmitted is 0, the high-level period will be shorter than the low-level period. FIG. 11 shows a relationship between the data value to be transmitted and the level of the signal output by the transmission unit 114. Note that as described above, if the transmission unit 114 outputs a high-level signal, the voltage of the contact point 116 will be approximately 0, and if the transmission unit 114 outputs a low-level signal, the voltage of the contact point 116 will be VM. Accordingly, the relationship between the data value to be transmitted and the voltage of the contact point 116 is the vertical inverse of the waveform shown in FIG. 11.

Returning to FIG. 1, an Enable signal setting unit 111 determines the Enable period based on the communication state managed by the state setting unit 112 and during the Enable period, notifies a storage unit 110 of this. In the Enable period, the storage unit 110 monitors whether or not the data value output by the demodulation unit 102 changes from 1 to 0, and if the data value changes from 1 to 0, the storage unit 110 stores the fact that a change occurred. As will be described later, the control unit 104 verifies the authenticity of the IC chip 106 according to whether or not the storage unit 110 stores the change.

Figure 4:
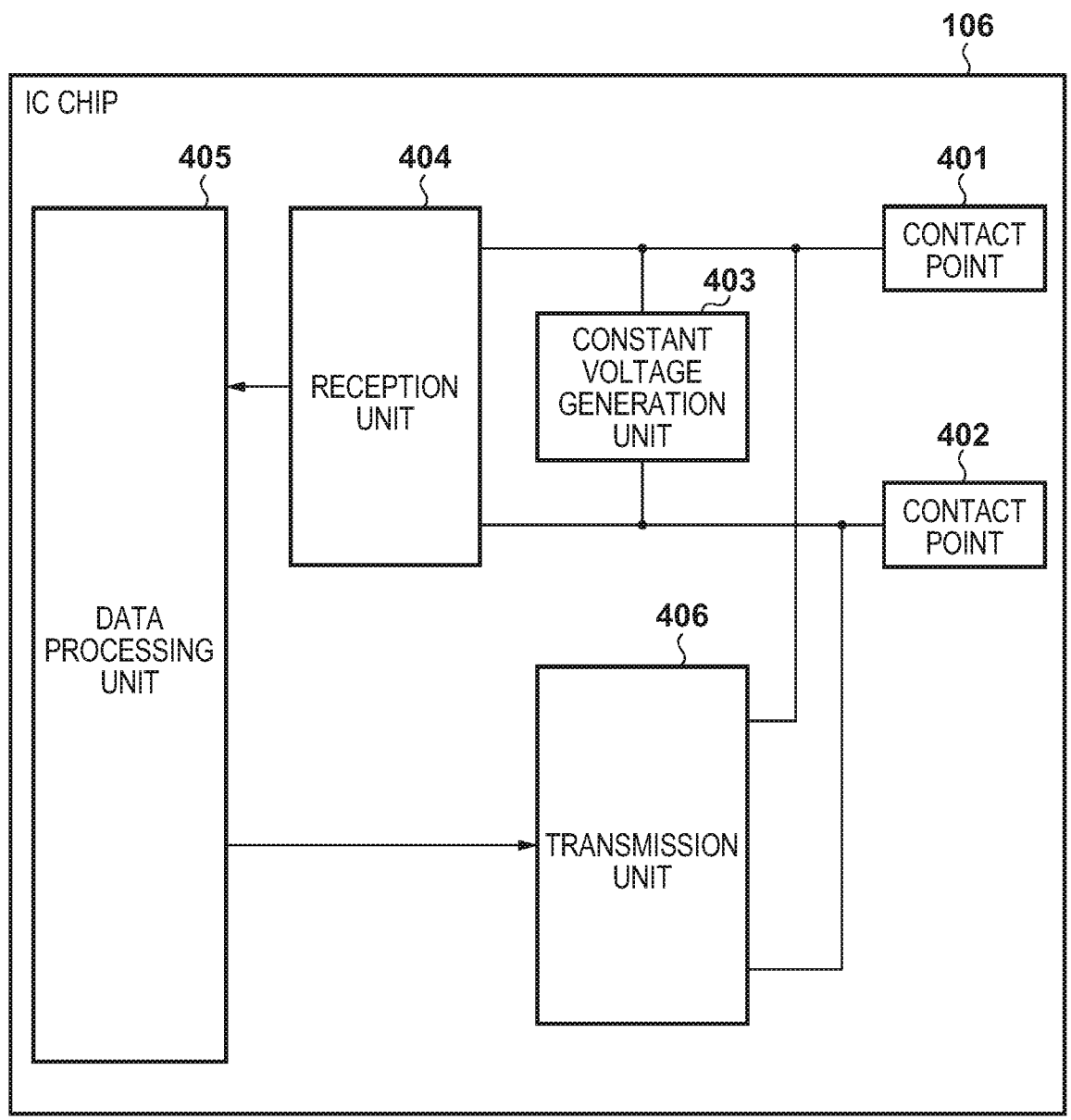
FIG. 4 is a diagram of a configuration of an IC chip according to an embodiment.

FIG. 4 is a diagram of a configuration of the IC chip 106. A contact point 401 is connected to the contact point 115 of the verification device 100, and a contact point 402 is connected to the contact point 116 of the verification device 100. Accordingly, the potential at the contact point 401 is equal to that at the contact point 115, and the potential at the contact point 402 is equal to the potential at the contact point 116. A constant voltage generation unit 403 generates a voltage to be used in the IC chip 106 using the voltage between the contact points 401 and 402. The reception unit 404 determines whether the data value from the verification device 100 is 1 or 0 based on the voltage between the contact points, and outputs the result to a data processing unit 405. The data processing unit 405 performs processing on data received from the verification device 100, generates data to be transmitted to the verification device 100 based on the processing result, and outputs the data to the transmission unit 406.

The data processing unit 405 holds the authentication information as described above and performs transmission and reception of various types of information to and from the verification device 100 for the authentication processing performed by the verification device 100. At this time, the data processing unit 405 performs cryptographic processing for authentication. Note that, for example, the cryptographic processing is executed using hardware. The transmission unit 406 transmits the data to the verification device 100 during the data reception state. Note that as described above, the IC chip 106 increases and reduces the operation power according to the data value to be transmitted. This is performed by the transmission unit 406 increasing and reducing the load according to whether the data value to be transmitted is 1 or 0. Note that the IC chip 106 is configured such that with the operation power of the IC chip 106 while data is not being transmitted, the voltage of the contact point 115 is not less than or equal to the threshold voltage Vth. In other words, the IC chip 106 is configured such that the potential at the contact point 115 is less than or equal to Vth only when the IC chip 106 transmits 0 as the data value. Hereinafter, it is assumed that the voltage of the contact point 115 while the IC chip is not performing data transmission is VH, which is the same as that at the time when 1 is transmitted as the data value.

Figure 5:
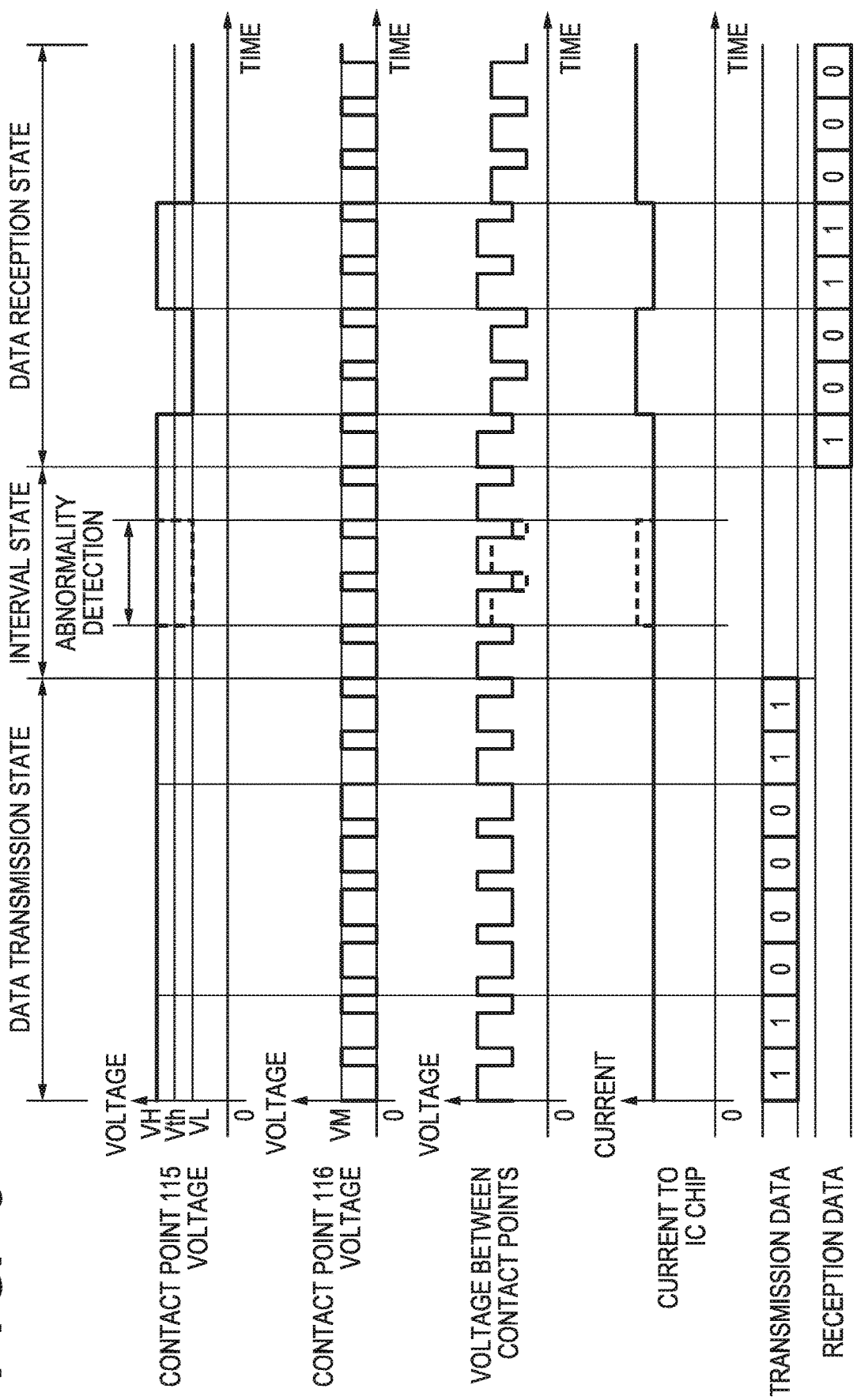
FIG. 5 is a diagram showing a signal waveform according to an embodiment.

FIG. 5 shows a signal waveform at a time of data transmission and reception between the verification device 100 and the IC chip 106. Note that here, the verification device 100 transmits the data "11000011" and the IC chip 106 transmits "10011000" as a response. As described with reference to FIG. 11, the voltage of the contact point 116 changed between VM and approximately 0 according to the data value transmitted by the verification device 100. Note that in the present embodiment, the transmission unit 114 outputs the data value 1 during the interval state and the data reception state. On the other hand, as described above, in the period of not being in the data reception state, the voltage of the contact point 115 is VH, which is greater than the threshold voltage Vth.

When the data reception state is entered, the transmission unit 406 of the IC chip 106 increases and reduces the load according to the transmitted data. In the present embodiment, in the period of not being in the data reception state, the voltage of the contact point 115 is greater than VL, and accordingly, the output of the demodulation unit 102 is at the high level, which corresponds to the data value 1. Here, in the period of not being in the data reception state, or in other words, in the Enable period, the storage unit 110 monitors that the output of the demodulation unit 102 is at the high level, and when switching from the high level to the low level occurs, the storage unit 110 stores that fact. In other words, in the period of not being in the data reception state, if the operation power of the IC chip 106 is greater than a predetermined value, that fact is stored.

If the IC chip 106 is not authentic, the operation power increases in the period of not being in the data reception state, and thus the potential at the contact point 115 falls below the threshold voltage Vth. In FIG. 5, the state in which the operation power of the IC chip 106 increases during the interval state, and thus the voltage of the contact point 115 is less than the threshold voltage Vth is indicated by a broken line. If the storage unit 110 stores the fact that the operation power of the IC chip 106 is larger than the predetermined voltage in the period of not being in the data reception state, the control unit 104 determined that the IC chip 106 is not authentic.

The verification device 100 monitors whether or not the operation power of the IC chip 106 is greater than the predetermined value in the predetermined period, and if the operation power is greater than the predetermined value in the predetermined period, the verification device determines that the IC chip 106 is not authentic. In the present embodiment, the predetermined period is a period other than the period in which the IC chip 106 performs data transmission. As described above, the verification device 100 also performs authentication processing based on the authentication information held by the IC chip 106. Here, even if the authentication processing based on the authentication information is successful, if the operation power of the IC chip 106 is greater than the predetermined value in the predetermined period, the verification device 100 determines that the IC chip 106 is not authentic. This is because if the operation power is greater than the threshold value in the predetermined period even though the authentication processing was successful, it can be inferred that the authentication information held by the authentic IC chip 106 has leaked. In summary, if the operation power of the IC chip 106 is greater than the predetermined value in the predetermined period, the verification device 100 determines that the IC chip 106 is not authentic, regardless of the result of the authentication processing. Note that if the operation power of the IC chip 106 is not greater than the predetermined value in the predetermined period and the result of the authentication processing is that it was successful, the verification device 100 determines that the IC chip 106 is authentic.

According to the configuration above, due to the leaking of authentication information, it is possible to determine a counterfeit product that uses a microcomputer, which is expected to arrive on the market at a low cost and in a short amount of time. This is because with a microcomputer that uses software to perform cryptographic processing, which is used in authentication processing, the operation power during the authentication processing is larger than that of the IC chip 106, which uses hardware to perform cryptographic processing.

Note that in the present embodiment, in the period other than the period in which the IC chip 106 transmits data, monitoring of whether or not the operation power of the IC chip 106 is greater than the predetermined value is performed. The period in which the IC chip 106 performs data transmission is excluded in order to make the threshold value for verifying the authenticity with the verification device 100 as small as possible. In other words, if the threshold value is made larger, there is a greater possibility that an inauthentic fake product cannot be detected. Normally, the IC chip 106 performs data transmission by increasing and reducing the operation power, but the operation power in the cryptographic processing performed using the hardware of the IC chip 106 can be made small using the maximum operation power when the IC chip 106 performs data transmission. In this case, by performing the determination outside of the period in which the IC chip 106 performs data transmission, the threshold value can be set to a smaller value, and thus the possibility of being able to defect a fake product increases. However, the predetermined period is not limited to being the period other than the period of data transmission performed by the IC chip 106, and can be determined based on the relationship between the operation power of the IC chip 106 and the state of the IC chip 106. Furthermore, if the operation power in the period in which the IC chip 106 performs data transmission is smaller than the operation power at the time of performing cryptographic processing using software, the predetermined period can be set to be all periods. In other words, it is possible to use a configuration in which the IC chip 106 is determined as a counterfeit product if the current that flows to the IC chip 106 is larger than the threshold value, regardless of the communication state. With the above-described configuration, the authenticity of the IC chip 106 that performs communication can be verified.

Second Embodiment

Next, a second embodiment will be described with a focus on differences from the first embodiment. In the first embodiment, the authenticity of an IC chip 106 connected by a communication wire to the verification device 100 is verified. In the present embodiment, the verification device 100 performs authentication on an IC tag 606 that communicates wirelessly with the verification device 100 through electromagnetic coupling with the verification device 100.

Figure 6:
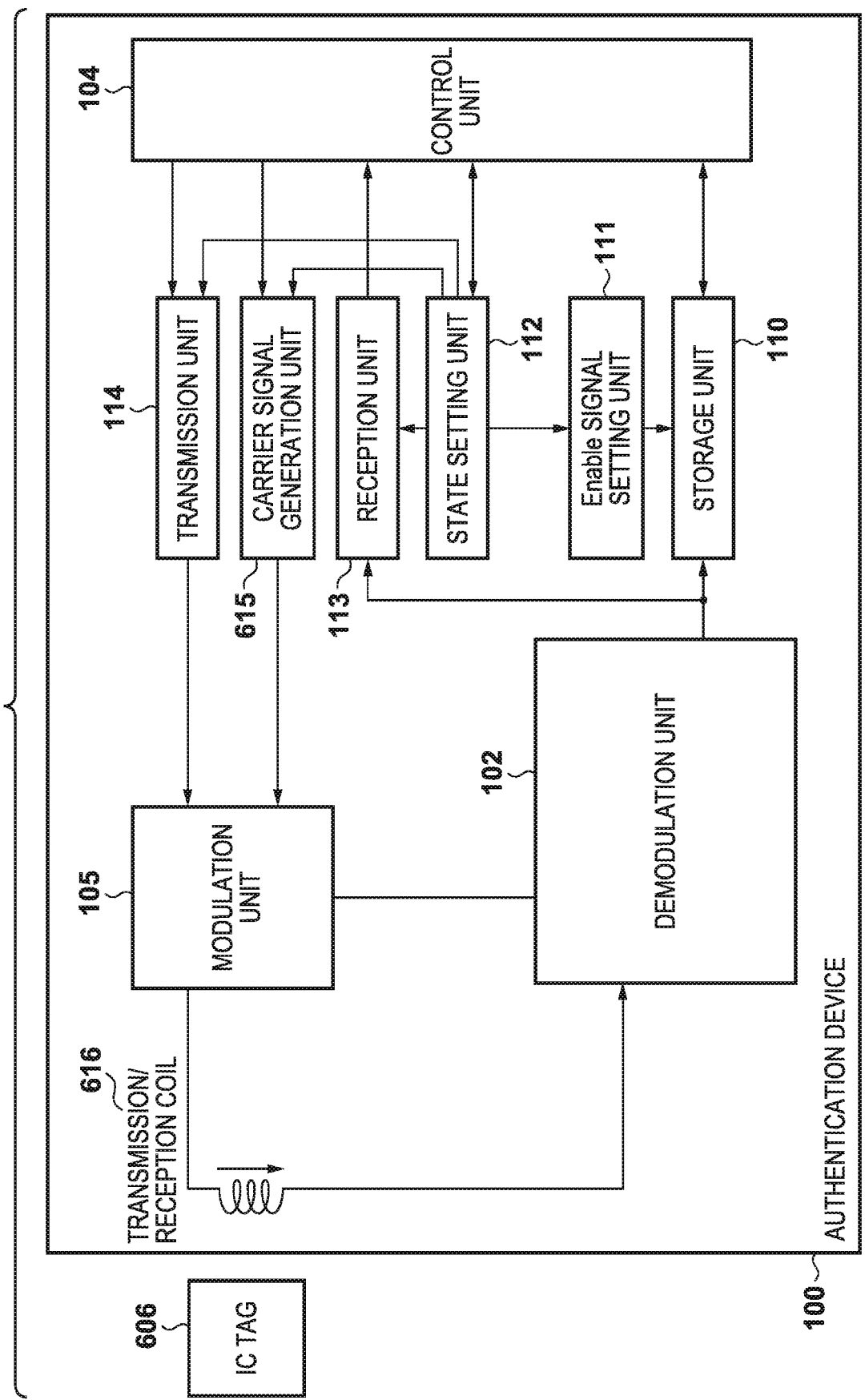
FIG. 6 is a diagram of a configuration of a verification device according to an embodiment.
Figure 7:
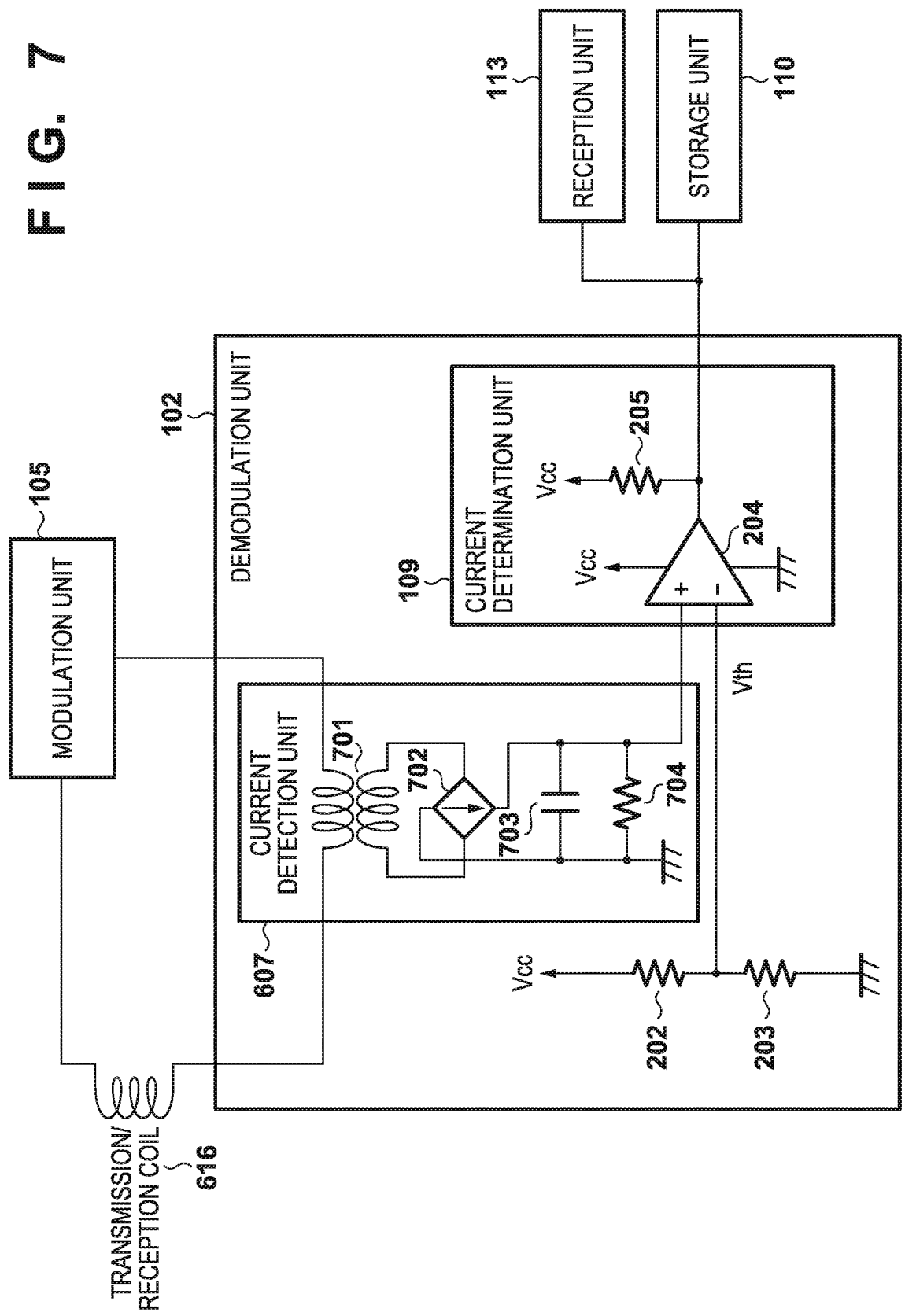
FIG. 7 is a diagram of a configuration of a demodulation unit according to an embodiment.

FIG. 6 is a diagram of a configuration of the verification device 100 according to the present embodiment. Note that constituent elements similar to those described in the first embodiment are denoted by the same reference signs thereas, and detailed description thereof is omitted here. The verification device 100 of the present embodiment has a transmission/reception coil 616 that electromagnetically couples with a coil of the IC tag 606, and the verification device 100 performs transmission and reception of data through the transmission/reception coil 616. FIG. 7 is a diagram showing a configuration of a demodulation unit 102 according to the present embodiment. A potential difference corresponding to the current that flows in the transmission/reception coil 616 is generated in a current transformer 701 of a current detection unit 607. A full-wave rectifying circuit 702 rectifies the voltage that is generated in the current transformer 701. Note that the capacitor 703 is provided in order to smooth the pulsating current, and a resistor 704 is provided for discharging the capacitor 703. In this manner, the current that flows in the transmission/reception coil 616 is converted into a direct current voltage by the current detection unit 607 and is input into a positive-side terminal of a comparator 204. Here, if the current that flows in the transmission/reception coil 616 increases, the voltage that is input into the positive-side terminal of the comparator 204 also increases. Note that similarly to the first embodiment, the threshold voltage Vth is input into the negative-side terminal of the comparator 204.

In the present embodiment as well, as will be described later, the IC tag 606 increases and reduces the operation power according to the data value to be transmitted. In the present embodiment, when 1 is transmitted as the data value, the IC tag 606 increases the operation power to be greater than when 0 is transmitted as the data value and greater than when no data is transmitted. In other words, the current that flows in the transmission/reception coil 616 when the IC tag 606 transmits the data value 1 is larger than the current that flows in the transmission/reception coil 616 at times other than that. Here, the voltage that is input into the positive-side terminal of the comparator 204 in the case where the IC tag 606 transmits the data value 1 is denoted as VH, and the voltage that is input into the positive-side terminal of the comparator 204 at times other than that is denoted as VL. Note that a configuration is used in which VH>Vth>VL is satisfied.

Figure 8:
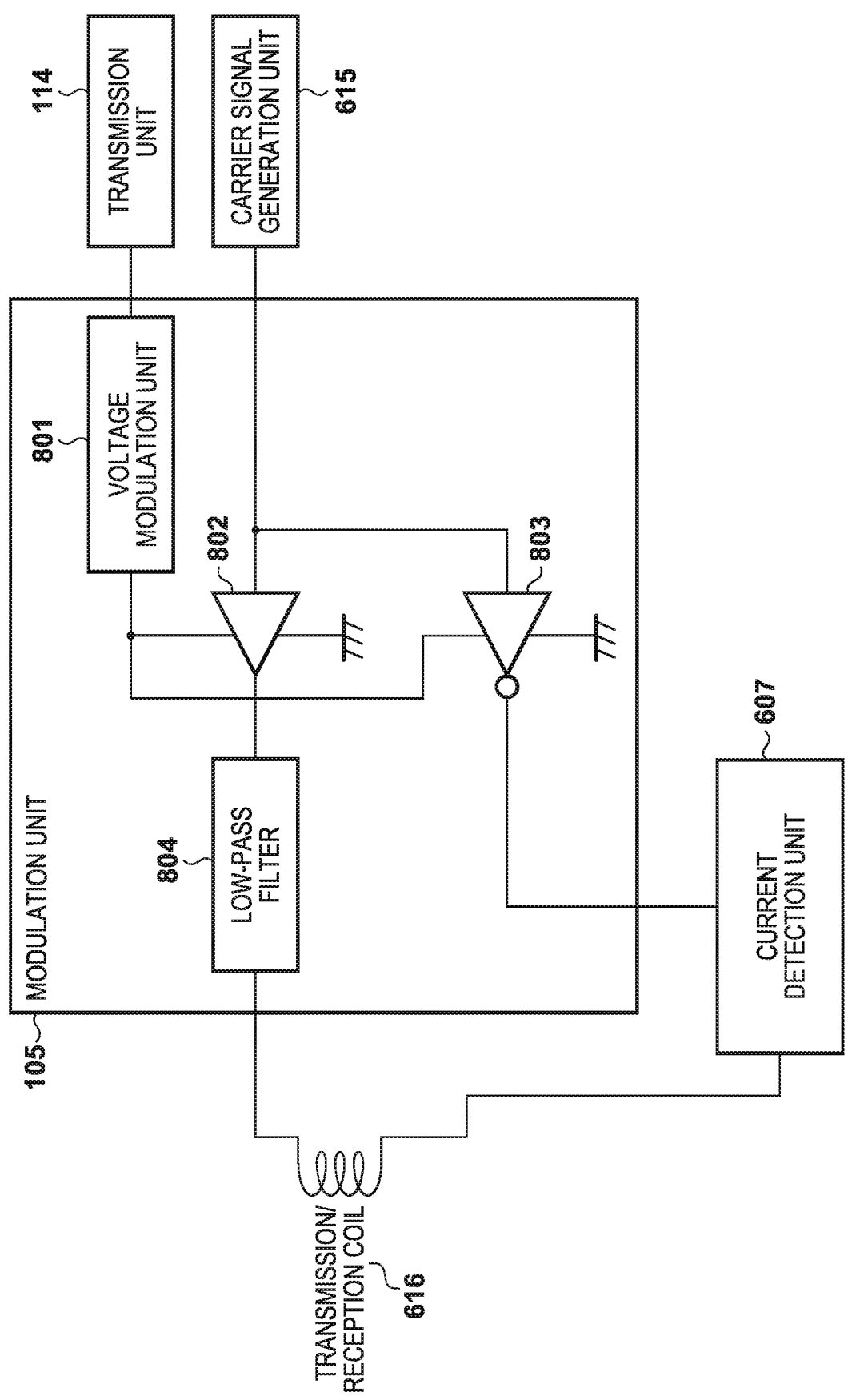
FIG. 8 is a diagram of a configuration of a modulation unit according to an embodiment.

FIG. 8 is a diagram of a configuration of the modulation unit 105. A voltage modulation unit 801 outputs a voltage V1 or V2 according to a high-level signal and a low-level signal output by the transmission unit 114. Note that V1>V2. A buffer 802 generates a positive-side modulated wave based on the voltage output by the voltage modulation unit 801 and a carrier signal from a carrier signal generation unit 615. On the other hand, an inverter 803 generates a negative-side modulated wave based on the voltage output by the voltage modulation unit 801 and a carrier signal from a carrier signal generation unit 615. The buffer 802 and the inverter 803 operate so as to be opposite to each other, and the output waveform is converted into a sine waveform by a low-pass filter 804.

Figure 12:
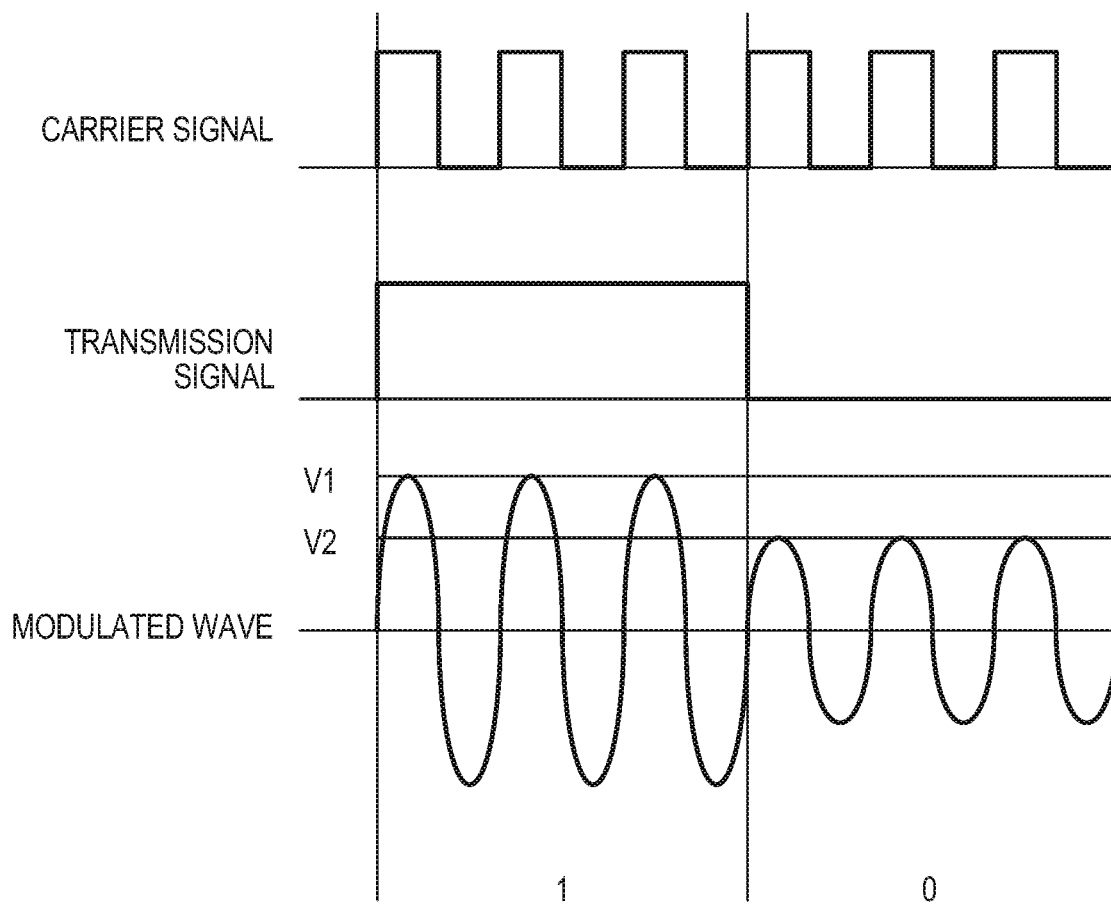
FIG. 12 is a diagram showing a relationship between a data value and a signal waveform according to an embodiment.

FIG. 12 shows the relationship between the transmission signal output by the transmission unit 114, the carrier signal from the carrier signal generation unit 615, the modulated wave applied to the transmission/reception coil 616, and the data values. As shown in FIG. 12, when the transmission signal is at a high level, or in other words, when the data value is 1, a sine wave with a maximum amplitude V1 and the same period as the carrier signal is output as the modulated wave. On the other hand, when the transmission signal is at a low level, or in other words, when the data value is 0, a sine wave with a maximum amplitude V2 and the same period as the carrier signal is output as the modulated wave. Note that in the present example, one data value is expressed in a period of three cycles of the carrier signal.

Figure 9:
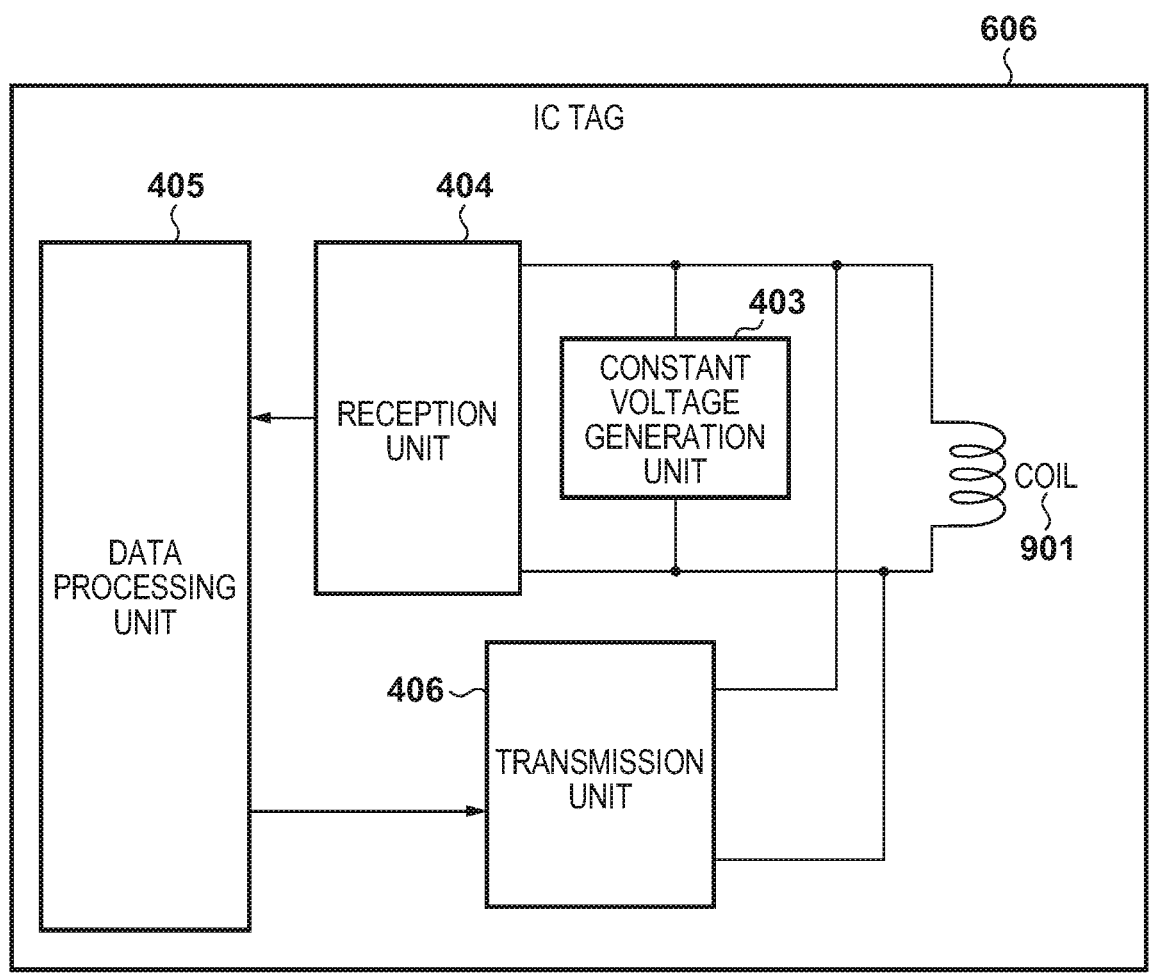
FIG. 9 is a diagram of a configuration of an IC tag according to an embodiment.

FIG. 9 is a diagram showing a configuration of the IC tag 606. The transmission/reception coil 901 electromagnetically couples with the transmission/reception coil 616 and performs data transmission and reception. The constant voltage generation unit 403 generates a voltage that is used by the IC tag 606 based on an induced electromotive force that occurs in the transmission/reception coil 901. As described above, in the present embodiment, when 1 is transmitted as the data value, the transmission unit 406 increases the operation power to be greater than at other times. Other configurations are similar to those of the IC chip 106 of first embodiment.

Figure 10:
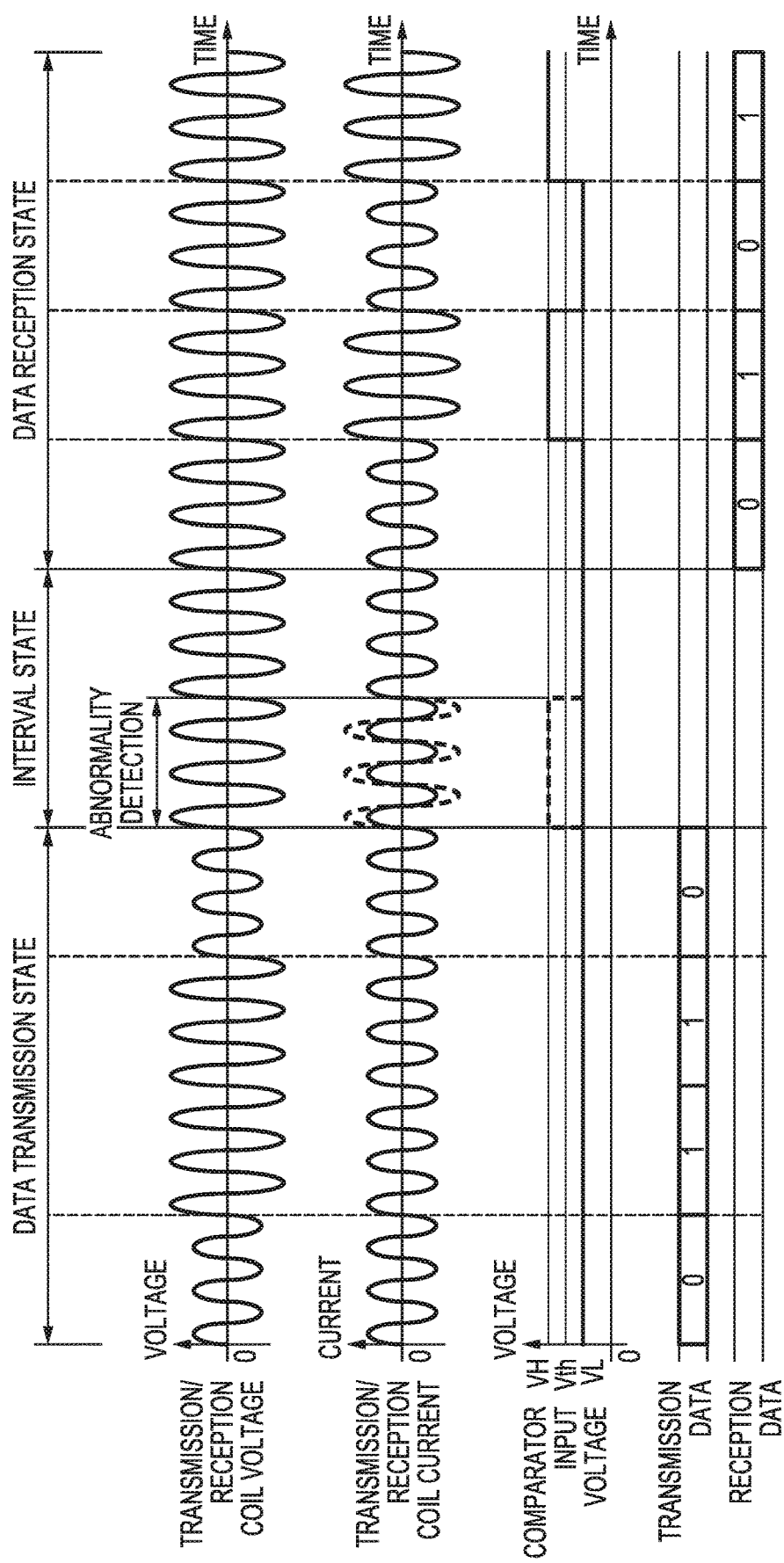
FIG. 10 is a diagram showing a signal waveform according to an embodiment.

FIG. 10 shows a signal waveform at a time of data transmission and reception between the verification device 100 and the IC tag 606. Note that here, it is shown that the verification device 100 transmits the data "0110" and as a response, the IC tag 606 transmits "0101". As described above, in the period of not being in the data reception state, the voltage input into the positive-side terminal of the comparator 204 is VL. Note that in the data reception state, the voltage input into the positive-side terminal of the comparator 204 is VH or VL according to the data transmitted by the IC tag 606.

The storage unit 110 monitors that the output of the demodulation unit 102 is at the low level, or in other words, that the data value is 0, in the period of not being in the data reception state. Also, if the output of the demodulation unit 102 reaches the high level in the period of not being in the data reception state, that fact is stored. In other words, in the period of not being in the data reception state, if the operation power of the IC tag 606 is greater than a predetermined value, that fact is stored. If the storage unit 110 stores the fact that the operation power of the IC tag 606 is larger than the predetermined voltage in the period of not being in the data reception state, the control unit 104 determines that the IC tag 606 is a fake product.

An authentic IC tag 606 is configured such that the operation voltage is not greater than a predetermined value at a time other than when data is being transmitted. Accordingly, in the period other than when the IC tag 606 transmits data, the verification device 100 monitors whether or not the operation power of the IC tag 606 is greater than a predetermined value, according to the current that flows in order to perform power supply to the IC tag 606. With this configuration, it is possible to easily determine whether or not the IC tag 606 performing communication is authentic. Note that similarly to the first embodiment, the operation power can be monitored in all of the periods in the present embodiment as well, and if the operation power is greater than the predetermined value, it can be determined that the IC tag 606 is a fake product. In other words, the period of monitoring the operation power need only be determined based on the state of the IC tag 606 and the operation power.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-078428, filed on Apr. 8, 2016, which is hereby incorporated by reference herein in its entirety.

What is claimed is:

1. An image forming apparatus, on which a replacement part having a verification target unit is detachably mounted, comprising:
a verification unit configured to verify authenticity of the verification target unit;
a contact portion configured to contact a unit contact portion of the verification target unit; and
a determination unit configured to determine a voltage value of the contact portion in a state where the contact portion and the unit contact portion of the verification target unit are in contact,
wherein, in a case that the voltage value of the contact portion is larger than a predetermined value, the verification unit determines that power consumption of the verification target unit is a first power value, and
wherein, in a case that the voltage value of the contact portion is smaller than the predetermined value, the verification unit determines that the power consumption of the verification target unit is a second power value larger than the first power value.

2. The image forming apparatus according to claim 1, wherein the determination unit is further configured to determine the voltage value of the contact portion in a predetermined period, and
the predetermined period is a period different from a first period, in which the verification unit transmits data to the verification target unit, and a second period, in which the verification target unit transmits data to the verification unit.

3. The image forming apparatus according to claim 1, wherein the verification unit and the verification target unit are connected to each other using two lines via two contact portions,
the two contact portions include a first contact portion, a voltage of which changes while the verification target unit transmits data to the verification unit, and a second contact portion, a voltage of which changes while the verification unit transmits data to the verification target unit, and
the contact portion is the first contact portion.

4. An image forming apparatus, on which a replacement part having a verification target unit is detachably mounted, comprising:
a verification unit configured to verify authenticity of the verification target unit, wherein the verification unit and the verification target unit respectively have a coil, and are configured to wirelessly communicate with each other; and
a determination unit configured to determine a voltage value corresponding to an electric current flowing in the coil of the verification unit;
wherein, in a case that the voltage value is larger than a predetermined value, the verification unit determines that power consumption of the verification target unit is a first power value, and
wherein, in a case that the voltage value is smaller than the predetermined value, the verification unit determines that the power consumption of the verification target unit is a second power value smaller than the first power value.

5. The image forming apparatus according to claim 4, wherein the determination unit is further configured to determine the voltage value in a predetermined period, and
the predetermined period is a period different from a first period, in which the verification unit transmits data to the verification target unit, and a second period, in which the verification target unit transmits data to the verification unit.

6. A replacement part that is detachably mounted on an image forming apparatus, comprising:
a verification target unit configured to communicate with a verification unit of the image forming apparatus in a state where the replacement part is attached to the image forming apparatus, and to have the authenticity of the verification target unit be verified by the verification unit, wherein the verification target unit is configured to contact a contact portion of the image forming apparatus in the state where the replacement part is attached to the image forming apparatus, wherein a voltage value of the contact portion is larger than a predetermined value in a case that power consumption of the verification target unit is a first power value, and wherein a voltage value of the contact portion is smaller than the predetermined value in a case that the power consumption of the verification target unit is a second power value larger than the first power value.

7. The replacement part according to claim 6, wherein a period, in which the authenticity is verified based on the voltage value of the contact portion is different in a first period, in which the verification unit transmits data to the verification target unit, and a second period, in which the verification target unit transmits data to the verification unit.

8. The replacement part according to claim 6, wherein the verification unit and the verification target unit are connected to each other using two lines via two contact portions, the two contact portions include a first contact portion, a voltage of which changes while the verification target unit transmits data to the verification unit, and a second contact portion, a voltage of which changes while the verification unit transmits data to the verification target unit, and the voltage value of the contact portion is a voltage value of the first contact portion.

9. The replacement part according to claim 8, wherein when data is transmitted to the verification unit from the verification target unit, a voltage value of the second contact portion changes to a first value and a second value larger than the first value according to the data.

10. A replacement part that is detachably mounted on an image forming apparatus, comprising:

a verification target unit configured to communicate with a verification unit of the image forming apparatus in a state where the replacement part is attached to the image forming apparatus, and to have the authenticity of the verification target unit be verified by the verification unit, wherein the verification unit and the verification target unit respectively have a coil, and are configured to wirelessly communicate with each other, wherein a voltage value of the coil of the verification unit is larger than a predetermined value in a case that power consumption of the verification target unit is a first power value, and wherein a voltage value of the coil of the verification unit is smaller than the predetermined value in a case that the power consumption of the verification target unit is a second power value smaller than the first power value.

11. The replacement part according to claim 10, wherein a period, in which the authenticity is verified based on the voltage value is different from a first period, in which the verification unit transmits data to the verification target unit, and a second period, in which the verification target unit transmits data to the verification unit.

* * * * *